United States Patent
Wells (10) Patent No.: US 10,063,508 B2
(45) Date of Patent: Aug. 28, 2018

(54) SYSTEM AND METHOD FOR SUPPORTING A PLUGGABLE EVENT SERVICE IN A DEPENDENCY INJECTION FRAMEWORK

(71) Applicant: Oracle International Corporation, Redwood Shores, CA (US)

(72) Inventor: John R. Wells, Scotch Plains, NJ (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 564 days.

(21) Appl. No.: 14/644,574

(22) Filed: Mar. 11, 2015

(65) Prior Publication Data

US 2015/0271121 A1    Sep. 24, 2015

Related U.S. Application Data

(60) Provisional application No. 61/968,046, filed on Mar. 20, 2014.

(51) Int. Cl.
*H04L 12/58* (2006.01)
*H04L 12/24* (2006.01)
*H04L 29/08* (2006.01)

(52) U.S. Cl.
CPC .......... *H04L 51/16* (2013.01); *H04L 41/0604* (2013.01); *H04L 41/5003* (2013.01);
(Continued)

(58) Field of Classification Search
CPC ... G06F 8/20; G06F 8/35; G06F 9/541; G06F 9/542; G06F 9/4428; G06F 9/4436;
(Continued)

(56) References Cited

U.S. PATENT DOCUMENTS

| | | | |
|---|---|---|---|
| 7,685,265 B1 * | 3/2010 | Nguyen | G06F 9/542 709/206 |
| 2005/0203949 A1 * | 9/2005 | Cabrera | H04L 67/02 |

(Continued)

OTHER PUBLICATIONS

Contexts & Dependency Injection for Java. N.p., n.d. Web. Jul. 12, 2016.

(Continued)

*Primary Examiner* — Nicholas R Taylor
*Assistant Examiner* — Michael Li
(74) *Attorney, Agent, or Firm* — Tucker Ellis LLP (57) ABSTRACT

A system and method can support a communication in a computing environment. A dependency injection (DI) based event system can be used to support the communication between a topic publisher and a topic subscriber in the computing environment. The system can use a topic service to distribute one or more messages from the topic publisher to the topic subscriber. Furthermore, the event system can provide a service provider interface (SPI) between the topic publisher and the topic subscriber. The event system delegates to the SPI one or more decisions on how the producer and the consumer are related in the computing environment, such as allowing a user, e.g. a system designer/assembler, to choose a quality of service (QoS) for supporting communication between the topic publisher and the topic subscriber.

20 Claims, 3 Drawing Sheets

(52) U.S. Cl.
CPC .............. *H04L 51/14* (2013.01); *H04L 51/22* (2013.01); *H04L 67/322* (2013.01)

(58) Field of Classification Search
CPC ............. G06F 9/44526; G06F 17/3089; G06F 17/30442; G06F 21/60; G06F 21/6218; G06F 21/6227; G06F 9/50; G06F 9/5072; G06F 9/5077; G06Q 40/02; H04L 41/0604; H04L 41/5003; H04L 51/00; H04L 51/14; H04L 51/16; H04L 51/22; H04L 63/08; H04L 63/12; H04L 63/0442; H04L 63/0823; H04L 67/02; H04L 67/26; H04L 67/28; H04L 67/322; H04L 67/2809; H04L 67/2823

See application file for complete search history.

(56) References Cited

U.S. PATENT DOCUMENTS

| | | | |
|---|---|---|---|
| 2005/0278335 A1* | 12/2005 | Patrick | G06F 21/6227 |
| 2006/0031355 A1* | 2/2006 | Patrick | H04L 67/28 709/206 |
| 2008/0301135 A1* | 12/2008 | Alves | G06F 17/30442 |
| 2009/0070785 A1* | 3/2009 | Alvez | G06F 9/541 719/318 |
| 2011/0185340 A1* | 7/2011 | Trent | G06F 8/20 717/104 |
| 2012/0173614 A1* | 7/2012 | Selitser | H04L 67/2809 709/203 |

OTHER PUBLICATIONS

"Code." Google Archive. N.p., n.d. Web. Jul. 12, 2016.
"Spring Framework." Spring Framework. N.p., n.d. Web. Jul. 12, 2016.

* cited by examiner

SYSTEM AND METHOD FOR SUPPORTING A PLUGGABLE EVENT SERVICE IN A DEPENDENCY INJECTION FRAMEWORK

CLAIM OF PRIORITY

This application claims priority on U.S. Provisional Patent Application No. 61/968,046, filed Mar. 20, 2014 entitled "PLUGGABLE EVENTING SERVICE IN DEPENDENCY INJECTION SYSTEM" which application is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software, and is particularly related to supporting communication in a computing environment.

BACKGROUND

Various dependency injection (DI)/inversion of control (IoC) frameworks, such as the context and dependency injection (CDI) framework and the Guice framework, allows different software components to communicate with each other. These systems often hard-code the different types of quality of service (QoS) into the implementation of the IoC container, which are not desirable.

These are the general areas that embodiments of the invention are intended to address.

SUMMARY

Described herein are systems and methods that can support communication in a computing environment. A dependency injection (DI) based event system can be used to support the communication between a topic publisher and a topic subscriber in the computing environment. The system can use a topic service to distribute one or more messages from the topic publisher to the topic subscriber. Furthermore, the event system can provide a service provider interface (SPI) between the topic publisher and the topic subscriber. The event system delegates to the SPI one or more decisions on how the producer and the consumer are related in the computing environment, such as allowing a user, e.g. a system designer/assembler, to choose a quality of service (QoS) for supporting communication between the topic publisher and the topic subscriber.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the HK2 dependency injection (DI) framework as an example for a dependency injection (DI) framework. It will be apparent to those skilled in the art that other types of dependency injection (DI) frameworks can be used without limitation.

Described herein are systems and methods that can support communication between different software components.

A Pluggable Event System in a Dependency Injection (DI) Framework

In accordance with an embodiment of the invention, an event system can be used in various dependency injection (DI)/Inversion of control (IoC) frameworks to allow unrelated software components to communicate with each other.

Figure 1:
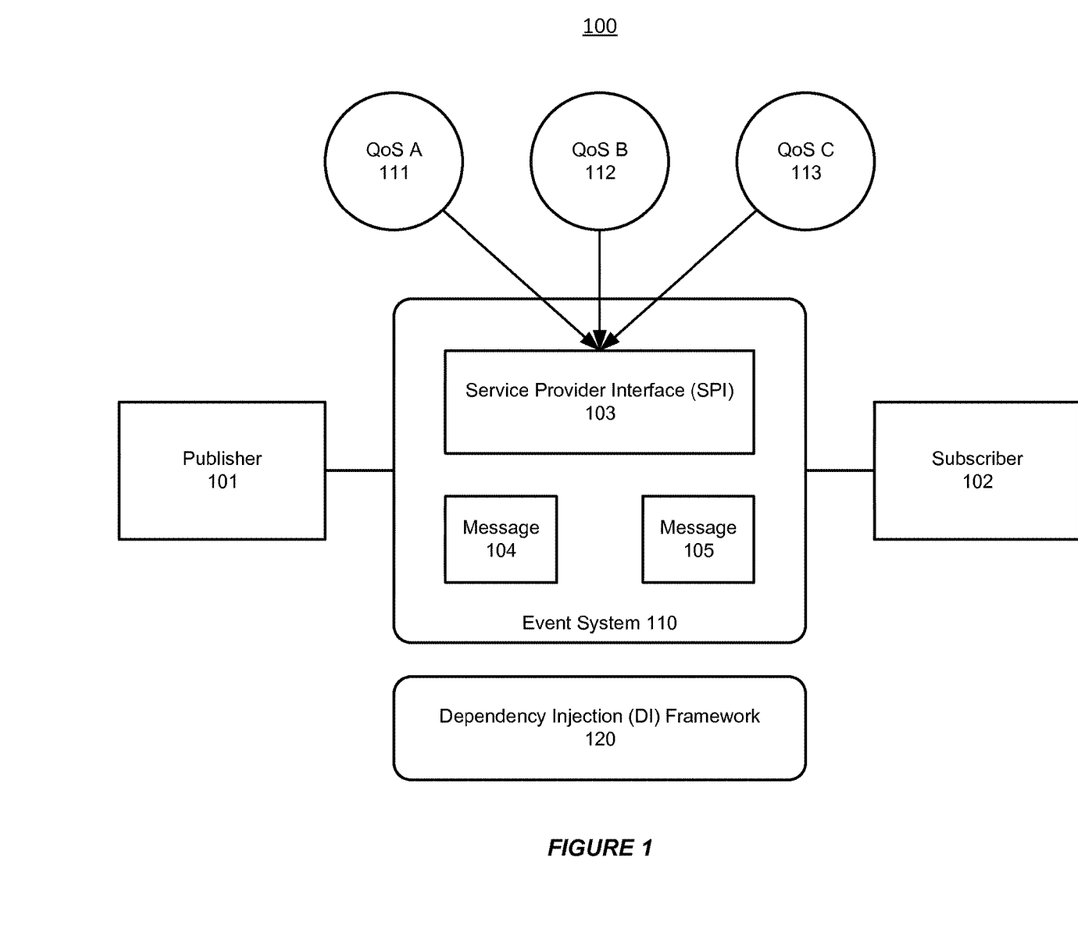
FIG. 1 shows an illustration of supporting a pluggable event system in a computing environment, in accordance with an embodiment of the invention.

FIG. 1 shows an illustration of supporting communication between software components in a computing environment, in accordance with an embodiment of the invention. As shown in FIG. 1, an event system 110, e.g. a HK2 event service, which is based on a dependency injection (DI) framework in a computing environment 100, can provide a pluggable mechanism that allows the delivery of different messages 104-105. For example, the messages 104-105 can be JAVA objects, which are delivered from a publisher 101 to a subscriber 102.

In accordance with an embodiment of the invention, the event system 110 can provide a service provider interface (SPI) 103 between the publisher 101 and the subscriber 102. Thus, the event system 110 can delegate the decisions, e.g. on how the publisher 111 and the subscriber 112 are related, to the pluggable SPI 103.

Furthermore, the event system 110 can plug in a messaging provider for providing various types of quality of service (QoS), which includes the threading model, the security model and the error handling model. Also, the event system can avoid hard-coding the different types of QoS into the implementation of the IoC container.

As shown in FIG. 1, the event system 110 can provide different types of QoS, such as the QoS A 111, QoS B 112, and QoS C 113, to the event system 110. Accordingly, the constructors of the event system 110 can configure the QoS for distributing a message 104 or 105 from the publisher 101 to the subscriber 102. Furthermore, the event system 110 can provide a default messaging provider, which may either be replaced or enhanced for providing the QoS desired by the application.

Thus, the event system 110 allows user applications to be loosely coupled (or to have low cohesion), since the publisher 101 and the subscriber 102 may not have any relationship other than agreeing on the event Type.

Figure 2:
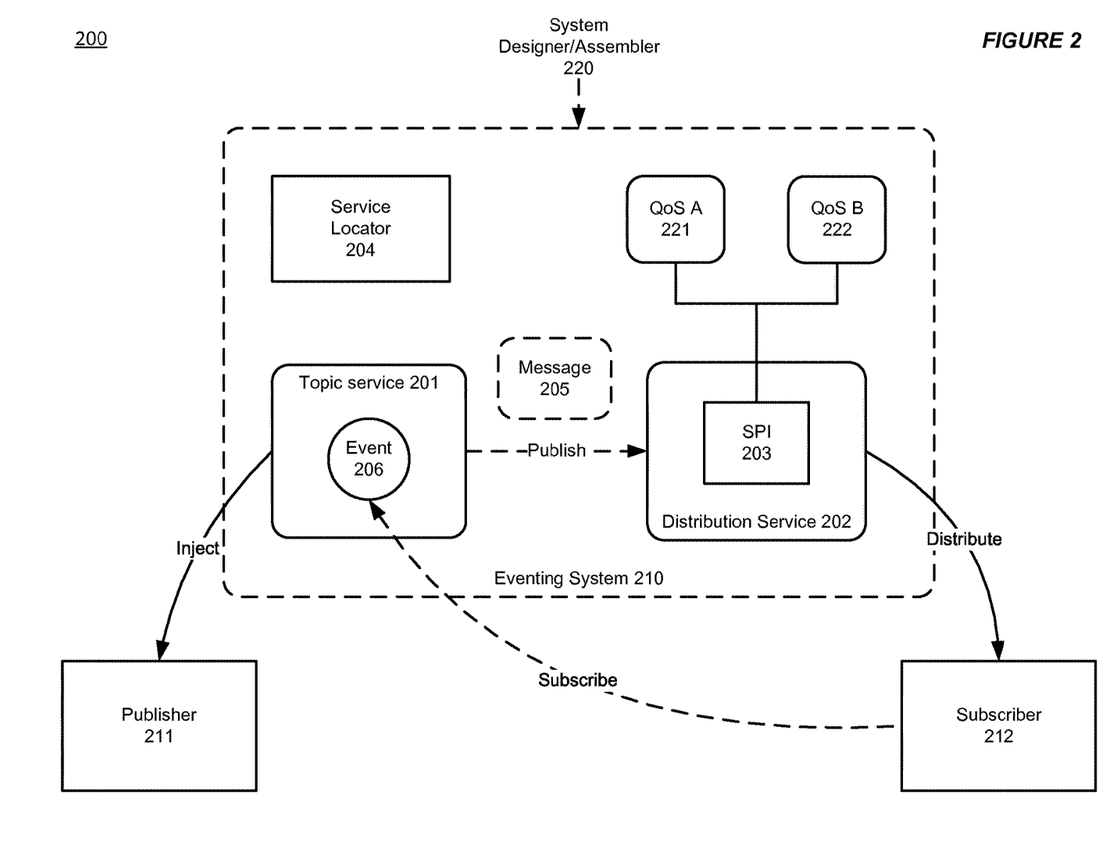
FIG. 2 shows an illustration of supporting a pluggable event system in a computing environment, in accordance with an embodiment of the invention.

FIG. 2 shows an illustration of supporting a pluggable event system in a dependency injection (DI) framework, in accordance with an embodiment of the invention. As shown in FIG. 2, a computing environment 200, which is based on a dependency injection (DI) framework, can use an event system 210 to support the communication between a publisher 211 and a subscriber 212 in a pluggable manner.

The event system 210 can include a topic service 201, which defines an event 206 and may be injected into a publisher 211. Furthermore, the event system 210 also allows a set of subscribers, e.g. the subscriber 212, to subscribe to the event 206.

When the publisher 211 publishes the event 206, the topic service 201 can use the distribution service 202 for distributing the message 205 to the subscriber 212. The publisher 211 and the subscriber 212 may not need to have any previous knowledge of each other.

As shown in FIG. 2, the event service 210 allows the designers of the event system 220 to control the quality of service between the producers 211 and the subscribers 212. For example, the system designer/assembler 220 can use a service provider interface (SPI) 203 for choosing a quality of service (QoS) from a list, including the QoS A 221 and QoS B 222, in order to support the communication between the publisher 211 and a subscriber 212.

In accordance with an embodiment of the invention, the topic service 201 is a service that can be looked up from a service locator 204. Also, the topic service 201 can be injected as a parameterized type. The following List 1 is a pseudo code for an exemplary Topic interface.

List 1

```
public interface Topic<T> {
    /**
     * @param message the non-null message to send to all
     current subscribers
     * @throws IllegalStateException If there is no
     implementation of
     * {@link TopicDistributionService} to do the distribution
     of the message
     */
    public void publish(T message);
    /**
     * @param name the value field of the Named annotation
     parameter, which may not be null
     * @return A topic further qualified with the given name
     */
    public Topic<T> named(String name);
    /**
     * @param type the type to restrict the returned Topic to
     * @return a Topic restricted to only producing messages
     of the given type
     */
    public <U> Topic<U> ofType(Type type);
    /**
     * @param qualifiers the qualifiers to further restrict this
     Topic to
     * @return an Topic restricted with the given qualifiers
     */
    public Topic<T> qualifiedWith(Annotation... qualifiers);
    /**
     * @return the Type of this topic (will not return null)
     */
    public Type getTopicType( );
    /**
     * @return the non-null but possibly empty set of qualifiers
     associated with this Topic
     */
    public Set<Annotation> getTopicQualifiers( );
}
```

As shown in the above List 1, the Topic interface can include a publish method, which publishes a non-null message to the subscribers. Also, the publish method can throw an exception when there is no available implementation of a topic distribution service that performs the message distribution.

Furthermore, the Topic interface can include a named method, which returns a topic that is further qualified with a given name. The named method can be provided with a value field of the Named annotation parameter, which may not be null.

Additionally, the Topic interface can include an ofType method, which returns a topic of a given type that may be more specific than the type of this topic.

Moreover, the Topic interface can include a qualifiedWith method, which further restrict this topic to a set of qualifiers; a getTopicType method, which obtains the type of this topic in order to match the message to subscribers; and a getTopicQualifiers method, which obtains the qualifiers associated with this topic.

In accordance with an embodiment of the invention, a user can define a customized event type, e.g. an ImportantEvent, which can be distributed to the subscribers. For example, an injection point for the ImportantEvent in the topic class can be shown as follows.

@Inject
Topic<ImportantEvent>importantEventTopic;

Furthermore, a topic may have various qualifiers, which can be used to select the set of subscribers that receive the message. In other words, the messages for the ImportantEvent may only be distributed to the subscribers that have matching qualifiers.

In the following example, only the subscribers who subscribe to the ImportEvent with a CodeRed qualifier can receive the messages for the CodeRed ImportEvent.

```
@Inject @CodeRed
Topic<ImportantEvent> importantEventTopic;
```

In accordance with an embodiment of the invention, an annotation can be associated with a parameter of a method to indicate that the method may be called when an annotated topic sends a message. For example, the HK2 event service can find the subscribers that are annotated with the following @SubscribeTo annotation.

```
@Documented
@Retention(RUNTIME)
@Target({PARAMETER})
public @interface SubscribeTo {
}
```

Furthermore, the subscribers can use different methods for subscribing to the ImportantEvent. For example, the topic publish method is invoked to publish an ImportantEvent, when one of the following methods is called.

```
public void importantEventSubscriber(@SubscribeTo ImportantEvent
event) {
    // Do something with this important event
}
public void importantEventSubscriber(@SubscribeTo ImportantEvent
event, ServiceLocator locator) {
    // Do something with this important event and with the
    ServiceLocator
}
public void importantEventSubscriber(ServiceLocator locator,
@SubscribeTo ImportantEvent event) {
    // Do something with this important event and with the
    ServiceLocator
}
```

Also, a parameter for a method, with a @SubscribeTo annotation, can take qualifiers. The qualifier may restrict the set of messages that are provided to the subscription method. For example, the following method may only receive ImportantEvents from the topics that are qualified with the CodeRed qualifier.

```
public void codeRedSubscriber(@SubscribeTo @CodeRed
    ImportantEvent redEvent) {
        // do something with the code-red event
}
```

Additionally, the method can be associated with other parameters, which may be considered as the injection points that are satisfied using various services. For example, if an injection point on a subscription method has scope, PerLookup, then the instance of that service may be disposed after the subscription method is returned.

In accordance with an embodiment of the invention, a distribution service 202 is responsible for distributing a message from the publisher 211 to the subscribers 212 after the message is published the topic service 201.

For example, the following Topicdistributionservice can distribute a message to the matching topic subscribers of a HK2 event service.

```
@Contract
public interface TopicDistributionService {
    public final static String
        HK2_DEFAULT_TOPIC_DISTRIBUTOR =
        "HK2TopicDistributionService";
    /**
    * @param topic the topic to which to distribute the
    message. Must not be null
    * @param message the message to send to the topic.
    Must not be null
    * @return A vendor specific object to be returned to
    the {@link Topic#publish(Object)} method
    */
    public void distributeMessage(Topic<?> topic, Object message);
}
```

The Topicdistributionservice may be implemented using the singleton scope. Furthermore, the Topicdistributionservice can provide a distributeMessage method that is responsible for sending events to the subscribers. The distributeMessage method can take the message to be sent and the topic sending the message as input parameters, wherein the topic parameter contains information describing the type of the topic and associated qualifiers.

In accordance with an embodiment of the invention, the event system can provide a default implementation for the TopicDistributionService service. For example, the HK2 event service can provide the HK2TopicDistributionService, which is the default Topicdistributionservice (with a priority number of 0).

Furthermore, the ServiceLocatorUtilities can add the name of the default TopicDistributionService into the registries. Also, the system can invoke the enableTopicDistribution method, provided by the ServiceLocatorUtilities, to enable the default topicdistributionservice.

```
public void initializeEvents(ServiceLocator locator) {
    ServiceLocatorUtilities.enableTopicDistribution(locator);
}
```

Using the default implementation, the subscribers may be called on the same thread as the caller of the publish method for the topic. The default topicdistributionservice may only distribute events to the services, the instances of which are created after the servicelocatorutilities method enableTopicDistribution has been called. Also, the default topicdistributionservice may not invoke the subscribers on a service that is disposed (or has had the associated descriptor removed).

Additionally, the registered implementations of the default topicdistributionerrorservice can handle the exceptions thrown by the subscribers (as well as the exceptions thrown when an injection point is not available).

In accordance with an embodiment of the invention, the event system can enhance the behavior of the default topicdistributionservice by providing (or adding) an implementation of the topicdistributionservice with a higher priority.

Also, the custom enhanced topicdistributionservice can delegate the receiving and handling of the messages to the default implementation. For example, the implementation of the topicdistributionservice may inject the default topicdistributionservice.

Thus, the event system 210 can provide flexibility in deciding which threading model and/or security model to be implemented. Also, the event system 210 can support error handling and remote messaging.

In accordance with an embodiment of the invention, the event system 210 can support error handling. For example, the following DefaultTopicDistributionErrorService may be used for handling the situation when a subscriber for the TopicDistributionService throws an exception.

```
@Contract
public interface DefaultTopicDistributionErrorService {
    /**
    * @param topic the topic that the message was sent to
    * @param message the message that was sent to the topic
    * @param error the exceptions thrown by the subscribers
    of this {@link Topic}
    */
    public void subscribersFailed(Topic<?> topic,
        Object message, MultiException error);
}
```

The MultiException indicates the error conditions of the subscribers, which threw the exception. Furthermore, the subscribersFailed( ) method can be called once per publish( ) method call, after the message is distributed to the subscribers. Also, the subscribersFailed( ) method may not be called if no subscribers threw exceptions.

Figure 3:
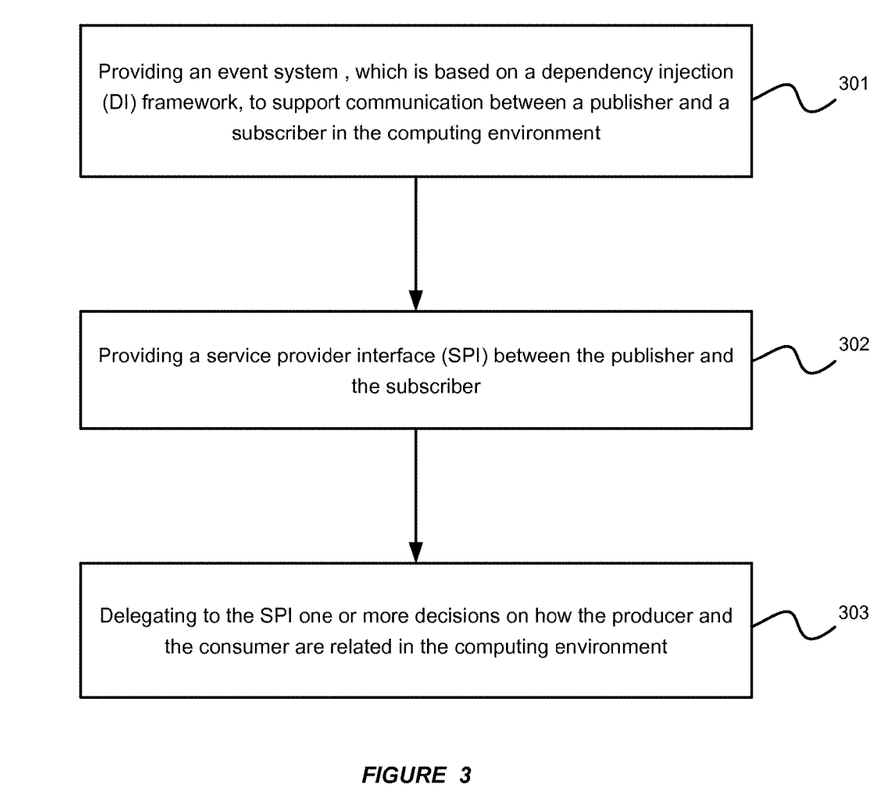
FIG. 3 illustrates an exemplary flow chart for supporting a pluggable event system in a computing environment, in accordance with an embodiment of the invention.

FIG. 3 illustrates an exemplary flow chart for supporting a pluggable event system in a computing environment, in accordance with an embodiment of the invention. As shown in FIG. 3, at step 301, an event system, which is based on a dependency injection (DI) framework, can support communication between a publisher and a subscriber in the computing environment. At step 302, the event system can provide a service provider interface (SPI) between the publisher and the subscriber. Furthermore, at step 303, the event system can delegate to the SPI one or more decisions on how the producer and the consumer are related in the computing environment.

An Example for Threaded Events

In accordance with an embodiment of the invention, the system designer/assembler can use a threaded model to improve the performance of the applications. For example, the event system can enhance the default HK2 messaging provider by invoking the subscribers on a separate thread (instead of relying on the default single threaded QoS, which invokes the subscribers on the thread of the publisher).

The following List 2 is an exemplary event distributor that can deliver messages to the subscribers, which run on a different thread from the publisher thread.

---
List 2
---

```
@Service @Singleton @Named @Rank(100)
public class ThreadedEventDistributor implements TopicDistributionService {
        @Inject @Named(TopicDistributionService.HK2_DEFAULT_TOPIC_DISTRIBUTOR)
        private TopicDistributionService defaultDistributor;
        @Override
        public void distributeMessage(Topic<?> topic, Object message) {
                Thread t = new Thread(new Distributor(topic, message), "TopicDistributor");
                t.setDaemon(true);
                t.start( );
        }
        private final class Distributor implements Runnable {
                private final Topic<?> topic;
                private final Object message;
                private Distributor(Topic<?> topic, Object message) {
                        this.topic = topic;
                        this.message = message;
                }
                @Override
                public void run( ) {
                        defaultDistributor.distributeMessage(topic, message);
                }
        }
}
```

As shown in the List 2, the system can modify the behavior of the HK2 default event mechanism by providing an implementation of the TopicDistributionService that delegates the HK2 default service to a different thread.

The ThreadedEventDistributor service is annotated with the @Service annotation, which infers that this service is provided using the singleton scope. Optionally, the ThreadedEventDistributor service can be annotated with the @Singleton annotation, which declares the singleton scope explicitly. Also, the service can be annotated with the @Named annotation, which is beneficial in the case when other implementations operate to inject and customize the ThreadedEventDistributor.

Furthermore, the ThreadedEventDistributor service can be annotated with the @Rank annotation. For example, the annotation, @Rank(100), allows the ThreadedEventDistributor service to have a higher rank than the default implementation of the topicdistributionservice, which indicates that the ThreadedEventDistributor service (instead of the default implementation of the topicdistributionservice) is invoked when the publish method in the topic class is invoked.

Additionally, the ThreadedEventDistributor service includes a distributeMessage method that can start a new thread for an instance of the ThreadedEventDistributor class, which is associated with the topic and message. The ThreadedEventDistributor can call the default HK2 implementation (e.g. in the run method) on a thread that is different from the caller thread.

Moreover, the ThreadedEventDistributor service can delegate the handling and distributing of the message to the default implementation of the topicdistributionservice (e.g. by injecting the TopicDistributionService with the specific name given to the HK2 default implementation).

Thus, the event system allows the users to avoid calling the same thread as the component producing the event. The ThreadedEventDistributor is a useful extension when the subscriber needs to perform a task that may take a long time.

The following List 3 shows the pseudo code for an exemplary subscriber:

---
List 3
---

```
@Service @Singleton
public class EventSubscriberService {
        private final Object lock = new Object( );
        private Long eventThreadId = null;
        /**
         * This is the method that is called on a different thread from
         * the thread used by the publisher
         * @param event the event that was raised
         */
        @SuppressWarnings("unused")
        private void eventSubscriber(@SubscribeTo Event event) {
                synchronized (lock) {
                        eventThreadId =
                        Thread.currentThread( ).getId( );
                        lock.notifyAll( );
                }
        }
        /**
         * Returns the thread-id upon which the event was raised
         * @return the thread-id of the thread on which the event was
         raised
         * @throws InterruptedException If the thread gets interrupted
         */
        public long getEventThread( ) throws InterruptedException {
                synchronized (lock) {
                        while (eventThreadId == null) {
                                lock.wait( );
                        }
                        return eventThreadId;
                }
        }
}
```

The following List 4 shows the pseudo code for an exemplary publisher that can call the publish method of the topic with a new event:

List 4

```
public class EventPublisherService {
        @Inject
        private Topic<Event> eventPublisher;
        /**
         * Publishes the event on the callers thread
         */
        public void publishEvent( ) {
                eventPublisher.publish(new Event( ));
        }
}
```

The following List 5 shows the pseudo code for testing the ThreadedEventDistributor.

List 5

```
@Test
public void testEventDeliveredOnADifferentThread( ) throws
InterruptedException {
        // Adds in the default event implementation
        ServiceLocatorUtilities.enableTopicDistribution(locator);
        ServiceLocatorUtilities.addClasses(locator,
                EventPublisherService.class,
                EventSubscriberService.class,
                ThreadedEventDistributor.class);
        EventSubscriberService subscriber =
        locator.getService(EventSubscriberService.class);
        EventPublisherService publisher =
        locator.getService(EventPublisherService.class);
        // This is my current thread, not the same thread as the
        subscriber method call
        long myThreadId = Thread.currentThread( ).getId( );
        // Publish the event
        publisher.publishEvent( );
        long subscriberThreadId = subscriber.getEventThread( );
        Assert.assertNotSame("Should have had different threadId
```

List 5 -continued

```
                from " + myThreadId,
                        myThreadId, subscriberThreadId);
        }
```

The testing code can record the thread identifier (ID) and check whether the thread ID for the publisher and the thread ID for the subscriber are different (for verifying whether the caller and the subscriber are on different threads).

An Example for Remote Events

In accordance with an embodiment of the invention, the event system can distribute a message to a remote subscriber across networks.

Furthermore, the event system can implement a distribution provider for shipping the remote events outside of the Java virtual machine (JVM). For example, the event system can enhance the default distribution provider by delivering events to a remote subscriber if a specific qualifier is present.

The following List 6 is an exemplary implementation of a @JmsRemote qualifier for enhancing the HK2 event mechanism. The @JmsRemote qualifier may show up in the getAllQualifiers method of the topic service.

List 6

```
@Qualifier
@Retention(RUNTIME)
@Target( { FIELD, PARAMETER })
public @interface JmsRemote { }
```

The following List 7 shows an exemplary implementation of the TopicDistributionService for distributing a message to a remote subscriber.

List 7

```
@Service @Singleton @Named @Rank(100)
public class RemoteEventDistributor implements TopicDistributionService {
        @Inject @Named(TopicDistributionService.HK2_DEFAULT_TOPIC_DISTRIBUTOR)
        private TopicDistributionService defaultDistributor;
        private Session session;
        private MessageProducer producer;
        @PostConstruct
        public void postConstruct( ) {
        try {
                InitialContext ic = new InitialContext( );
                javax.jms.Topic topic = (javax.jms.Topic) ic.lookup("remoteTopic");
                ConnectionFactory factory = (ConnectionFactory)
                ic.lookup("java:comp/DefaultConnectionFactory");
                Connection connection = factory.createConnection( );
                session = connection.createSession(Session.AUTO_ACKNOWLEDGE);
                producer = session.createProducer(topic);
                connection.start( );
        }
        catch (NamingException | JMSException e) {
                throw new AssertionError(e);
        }
        }
        public void distributeMessage(Topic<?> topic, Object message) {
                // Distribute all messages locally
                defaultDistributor.distributeMessage(topic, message);
                if (!(message instanceof Serializable)) {
                        // If the message is not serializable do not try to send it remotely
                        return;
                }
                Set<Annotation> qualifiers = topic.getTopicQualifiers( );
                JmsRemote remote = null;
                for (Annotation qualifier : qualifiers) {
                        if (JmsRemote.class.equals(qualifier.annotationType( ))) {
                                remote = (JmsRemote) qualifier;
```

List 7

```
                break;
            }
    }
    if (remote == null) {
            // No JmsRemote qualifier, just distribute the message locally
                    return;
    }
    // Distribute the message to a remote topic
    try {
            ObjectMessage jmsMessage =
                    session.createObjectMessage((Serializable) message);
            producer.send(jmsMessage);
    }
    catch (JMSException e) {
            throw new AssertionError(e);
    }
    }
}
```

As shown in the List 7, the event system can modify the behavior of the default event mechanism by providing an implementation of the TopicDistributionService, which can send messages to a remote JMS topic if the topic is annotated with the @JmsRemote qualifier.

The RemoteEventDistributor can be set up with a rank (e.g. 100), which is higher than the rank for the default implementation of TopicDistributionService. Thus, when the TopicDistributionService is invoked, the RemoteEventDistributor service may be called instead of the default implementation of the TopicDistributionService.

Additionally, the RemoteEventDistributor service can inject the default TopicDistributionService service (e.g. the HK2 default service) and uses the default TopicDistributionService for distributing the messages locally.

Furthermore, the RemoteEventDistributor service includes a PostConstruct method, which sets up the remote Topic and JMS Session. For example, the postContruct method can set up the remote queue by getting a Java Naming and Directory Interface (JNDI) InitialContext (and adding the remote parameters to the InitialContext such as the remote URL and security credentials). Then, the RemoteEventDistributor service uses the InitialContext to find a remote JMS topic and ConnectionFactory.

Furthermore, the RemoteEventDistributor service can create the JMS JMS Session and MessageProducer before starting the connection. The JMS Session and MessageProducer, which are set by the postConstruct method, can be used for supporting the remote distribution step. Thus, the senders can be ready to send messages remotely.

As shown in the List 7, the distributeMessage method first uses the default implementation to distribute the message given locally. Then, the distributeMessage method inspects the qualifiers on the topic to see if the @JmsRemote qualifier is present.

If the @JmsRemote qualifier is present, the distributeMessage method can use the JMS session to create a JMS ObjectMessage from the incoming message, before publishing the message to the JMS topic. Then, this message can be sent to the remote JMS subscribers, which receives messages from this JMS Topic.

Thus, by taking advantage of the pluggability of the TopicDistributionService, the system can change the QoS of the messaging system from being entirely local to including remote subscribers.

The following List 8 shows a pseudo code for an exemplary client, which uses an HK2 topic service for sending remote messages.

List 8

```
public class RemoteEventPublisher {
        @Inject @JmsRemote
        private Topic<Serializable> eventPublisher;
        /**
        * Publishes the event locally and remotely!
        */
        public void publishEvent(Serializable remoteEvent) {
                    eventPublisher.publish(remoteEvent);
        }
}
```

As shown in the above List 8, the client can use the HK2 topic to send serializable messages remotely, since the eventPublisher topic includes the @JmsRemote qualifier (which indicates that the plugin will send the messages remotely).

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting communication in a computing environment, the method comprising:
providing an event system, which is based on a dependency injection (DI) framework, to support communication between an associated publisher publishing messages on a first thread in the computing environment and an associated subscriber of the messages in the computing environment;
providing a service provider interface (SPI) between the associated publisher and the associated subscriber, the SPI being pluggable to selectively receive from an associated source a quality of service (QoS) instruction directing the SPI to deliver the messages from the associated publisher to the associated subscriber in accordance with the QoS instruction;
receiving a plug-in by the SPI, the received plug-in comprising a QoS instruction directing the SPI that the messages published by the associated publisher on the first thread are to be delivered to the associated subscriber on a second thread different than the first thread;
delegating to the SPI one or more decisions on how the associated publisher and the associated subscriber are related in the computing environment; and
delivering the messages published by the associated publisher on the first thread to the associated subscriber on the second thread in accordance with the QoS instruction of the plug-in and the delegating.

2. The method of claim 1, further comprising:
providing a topic service; and
using the topic service to distribute the messages from the associated publisher to the associated subscriber.

3. The method of claim 2, further comprising:
injecting the topic service into the associated publisher.

4. The method of claim 3, further comprising:
receiving from the associated subscriber a request to subscribe to an event that is associated with the topic service; and
allowing the associated subscriber to subscribe to the event that is associated with the topic service.

5. The method of claim 3, further comprising:
distributing the messages to the associated subscriber after the associated publisher publishes the event.

6. The method of claim 5, further comprising:
providing a distribution service, the distribution service distributing the messages from the associated publisher to the associated subscriber.

7. The method of claim 6, further comprising:
associating the SPI with the distribution service, wherein the SPI provides a plurality of quality of service (QoS) choices to an associated constructor of the event system.

8. The method of claim 7, further comprising:
receiving from an associated user a selection input to select a QoS from the plurality of QoS choices for the communication between the associated publisher and the associated subscriber.

9. The method of claim 1, further comprising:
providing a default quality of service (QoS) to the event system.

10. The method of claim 9, further comprising:
associating the event system with a QoS that supports at least one of:
a security model,
a threading model,
error handling, and/or
remote messaging.

11. A system for supporting communication in a computing environment, the system comprising:
a computer system comprising one or more microprocessors and a memory device; and
an event system, running on the computer system, wherein the event system, which is based on a dependency injection (DI) framework, supports communication between an associated publisher publishing messages on a first thread in the computing environment and an associated subscriber of the messages in the computing system,
wherein the event system operates to:
provide a service provider interface (SPI) between the associated publisher and the associated subscriber, the SPI being pluggable to selectively receive from an associated source a quality of service (QoS) instruction directing the SPI to deliver the messages from the associated publisher to the associated subscriber in accordance with the QoS instruction;
receiving a plug-in by the SPI, the received plug-in comprising a QoS instruction directing the SPI that the messages published by the associated publisher on the first thread are to be delivered to the associated subscriber on a second thread different than the first thread;
delegate, to the SPI, one or more decisions about how the associated publishers and the associated subscribers are related in the computing system environment; and
delivering the messages published by the associated publisher on the first thread to the associated subscriber on the second thread in accordance with the QoS instruction of the plug-in and the delegating.

12. The system according to claim 11, wherein:
the event system operates to use a topic service to distribute the messages from the associated publisher to the associated subscriber.

13. The system of claim 12, wherein:
the topic service is adapted to be injected into the associated publisher.

14. The system of claim 13, wherein:
the event system is configured to receive from the associated subscriber a request to subscribe to an event that is associated with the topic service.

15. The system of claim 13, wherein:
the event system operates to distribute the messages to the associated subscriber after the associated publisher publishes the event.

16. The system of claim 15, further comprising:
a distribution service, the distribution service distributing the messages from the associated publisher to the associated subscriber.

17. The system of claim 16, wherein:
the distribution service is associated with the SPI, which provides a plurality of quality of service (QoS) choices to an associated constructor of the event system.

18. The system of claim 17, wherein:
the event system is configured to receive from an associated user a selection input to select a QoS from the plurality of QoS choices for the communication between the associated publisher and the associated subscriber.

19. The system of claim 11, further comprising:
a default QoS associated with the event system, wherein the event system is configured to enhance the default QoS to support at least one of:
   a security model,
   a threading model,
   error handling, and/or
   remote messaging.

20. A non-transitory machine readable storage medium having instructions stored thereon for supporting communication in a computing environment, which instructions, when executed cause a computer system to perform the steps comprising:
   providing an event system, which is based on a dependency injection (DI) framework, to support communication between an associated publisher publishing messages on a first thread in the computing environment and an associated subscriber of the messages in the computing environment;
   providing a service provider interface (SPI) between the associated publisher and the associated subscriber, the SPI being pluggable to selectively receive from an associated source a quality of service (QoS) instruction directing the SPI to deliver the messages from the associated publisher to the associated subscriber in accordance with the QoS instruction;
   receiving a plug-in by the SPI, the received plug-in comprising a QoS instruction directing the SPI that the messages published by the associated publisher on the first thread are to be delivered to the associated subscriber on a second thread different than the first thread;
   delegating to the SPI one or more decisions on how the associated publisher and the associated subscriber are related in the computing environment; and
   delivering the messages published by the associated publisher on the first thread to the associated subscriber on the second thread in accordance with the QoS instruction of the plug-in and the delegating.

* * * * *

UNITED STATES PATENT AND TRADEMARK OFFICE
CERTIFICATE OF CORRECTION

PATENT NO. : 10,063,508 B2
APPLICATION NO. : 14/644574
DATED : August 28, 2018
INVENTOR(S) : Wells Page 1 of 1

It is certified that error appears in the above-identified patent and that said Letters Patent is hereby corrected as shown below:

In the Drawings

On Sheet 3 of 3, in FIGURE 3, under Reference Numeral 301, Line 1, delete "system ," and insert -- system, --, therefor.

Signed and Sealed this
Sixteenth Day of July, 2019

Andrei Iancu
*Director of the United States Patent and Trademark Office*